(12) United States Patent
Höglund et al.

(10) Patent No.: US 10,514,066 B2
(45) Date of Patent: Dec. 24, 2019

(54) COOLING OR HEATING OF BEARINGS IN A CENTRIFUGAL SEPARATOR

(71) Applicant: ALFA LAVAL CORPORATE AB, Lund (SE)

(72) Inventors: Kasper Höglund, Rönninge (SE); Peter Thorwid, Sundbyberg (SE)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 15/563,380

(22) PCT Filed: Mar. 21, 2016

(86) PCT No.: PCT/EP2016/056135
§ 371 (c)(1),
(2) Date: Sep. 29, 2017

(87) PCT Pub. No.: WO2016/156088
PCT Pub. Date: Oct. 6, 2016

(65) Prior Publication Data
US 2018/0087577 A1    Mar. 29, 2018

(30) Foreign Application Priority Data
Mar. 31, 2015    (EP) ..................... 15161955

(51) Int. Cl.
*B04B 9/12*    (2006.01)
*B04B 15/02*    (2006.01)
(Continued)

(52) U.S. Cl.
CPC .............. *F16C 37/007* (2013.01); *B04B 9/04* (2013.01); *B04B 9/12* (2013.01); *B04B 15/02* (2013.01); *F16C 19/06* (2013.01); *F16C 2320/42* (2013.01)

(58) Field of Classification Search
CPC .. B04B 15/00; B04B 9/04; B04B 9/12; B04B 9/00; B04B 15/02; B04B 9/02;
(Continued)

(56) References Cited

U.S. PATENT DOCUMENTS 1,439,491 A * 12/1922 Stehli ...................... F16C 37/00
464/17
2,308,697 A    1/1943 Kivley
(Continued)

FOREIGN PATENT DOCUMENTS

CN    101268292 A    9/2008
CN    201661614 U    12/2010
(Continued)

OTHER PUBLICATIONS

International Search Report, issued in PCT/EP2016/056135, dated Jul. 18, 2016.
(Continued)

*Primary Examiner* — Charles Cooley
(74) *Attorney, Agent, or Firm* — Birch, Stewart, Kolasch & Birch, LLP

(57) ABSTRACT

A centrifugal separator includes a frame and a drive member configured to rotate a rotating part in relation to the frame around an axis of rotation. The rotating part includes a centrifuge rotor enclosing a separation space. The centrifuge rotor is adjoined to a hollow spindle supported by the frame by at least one bearing device. The interior of the hollow spindle is in thermal contact with the at least one bearing device and further includes a thermal transfer medium inlet for supplying a thermal transfer medium to said interior and a thermal transfer medium outlet for withdrawing the thermal transfer medium from the interior; and directing mechanism for directing thermal transfer medium from the thermal transfer medium inlet to the thermal transfer medium outlet (Continued)

in a first direction along the length of the spindle and in a second direction along the length of the spindle. The second direction is opposite the first direction. The first or second direction is along the inner wall of the interior of the spindle, the inner wall being arranged to rotate during operation of the centrifugal separator.

15 Claims, 9 Drawing Sheets

(51) Int. Cl.
*B04B 9/04* (2006.01)
*F16C 37/00* (2006.01)
*F16C 19/06* (2006.01)

(58) Field of Classification Search
CPC ... B04B 9/06; B04B 7/02; B04B 13/00; F16C 37/007; F16C 19/06; F16C 2320/42
USPC .............. 494/41, 13–14, 83; 464/17
See application file for complete search history.

(56) References Cited

U.S. PATENT DOCUMENTS

| | | | |
|---|---|---|---|
| 2,876,949 A | 3/1959 | Skarstrom | |
| 3,527,402 A * | 9/1970 | Kobetsky | B04B 9/12 494/10 |
| 3,604,769 A * | 9/1971 | Latham, Jr. | B04B 9/00 384/476 |
| 3,645,593 A | 2/1972 | Irwin | |
| 3,727,832 A * | 4/1973 | Maclin | B04B 5/04 494/13 |
| 3,904,256 A * | 9/1975 | Pfeifer | B04B 9/00 384/108 |
| 4,170,344 A | 10/1979 | Megerle et al. | |
| 4,412,707 A * | 11/1983 | Buffet | F16C 27/08 384/606 |
| 4,541,736 A | 9/1985 | Giebeler, Jr. | |
| 4,708,711 A | 11/1987 | Scherer | |
| 4,941,866 A * | 7/1990 | Gorodissky | B04B 15/02 494/14 |
| 5,541,975 A | 7/1996 | Anderson et al. | |
| 6,011,829 A | 1/2000 | Panasik | |
| 6,445,769 B1 | 9/2002 | Panasik et al. | |
| 7,396,324 B2 * | 7/2008 | Tetsu | B04B 5/0414 494/10 |
| 7,794,383 B2 * | 9/2010 | Tetsu | B04B 5/0414 494/14 |
| 7,909,751 B2 | 3/2011 | Tobita et al. | |
| 8,182,408 B2 * | 5/2012 | Isaksson | B01D 45/14 494/70 |
| 8,496,533 B2 | 7/2013 | Beers et al. | |
| 2005/0107235 A1 * | 5/2005 | Tetsu | B04B 5/0414 494/10 |
| 2006/0009341 A1 * | 1/2006 | Tobita | A61L 2/07 494/14 |
| 2008/0300124 A1 * | 12/2008 | Akatsu | B04B 7/02 494/14 |
| 2008/0304780 A1 | 12/2008 | Klintenstedt | |
| 2009/0197752 A1 * | 8/2009 | Spiegel | B04B 7/02 494/7 |
| 2010/0075823 A1 * | 3/2010 | Toi | B04B 5/0442 494/6 |
| 2011/0190111 A1 * | 8/2011 | Toi | B04B 5/0414 494/10 |
| 2012/0220441 A1 * | 8/2012 | Spiegel | G06F 17/30867 494/10 |
| 2013/0017943 A1 * | 1/2013 | Toi | B04B 11/02 494/2 |
| 2013/0331251 A1 * | 12/2013 | Toi | B04B 9/10 494/9 |
| 2015/0057141 A1 * | 2/2015 | Toi | B04B 5/10 494/10 |
| 2015/0283561 A1 | 10/2015 | Mackel et al. | |
| 2018/0087577 A1 * | 3/2018 | Hoglund | F16C 37/007 |

FOREIGN PATENT DOCUMENTS

| | | |
|---|---|---|
| CN | 202001382 U | 10/2011 |
| CN | 102350403 A | 2/2012 |
| CN | 202719135 U | 2/2013 |
| DE | 10 2012 110 846 A1 | 5/2014 |
| EP | 0 221 532 A2 | 5/1987 |
| EP | 0 221 532 A3 | 12/1987 |
| GB | 663141 | 12/1951 |
| GB | 736356 | 9/1955 |
| WO | WO 2007/040427 A1 | 4/2007 |

OTHER PUBLICATIONS

Writtten Opinion of the International Searching Authority, issued in PCT/EP2016/056135, dated Jul. 18, 2016.
English translation of the Chinese Office Action and Search Report for Chinese Application No. 201680020158.2, dated Nov. 14, 2018.

* cited by examiner

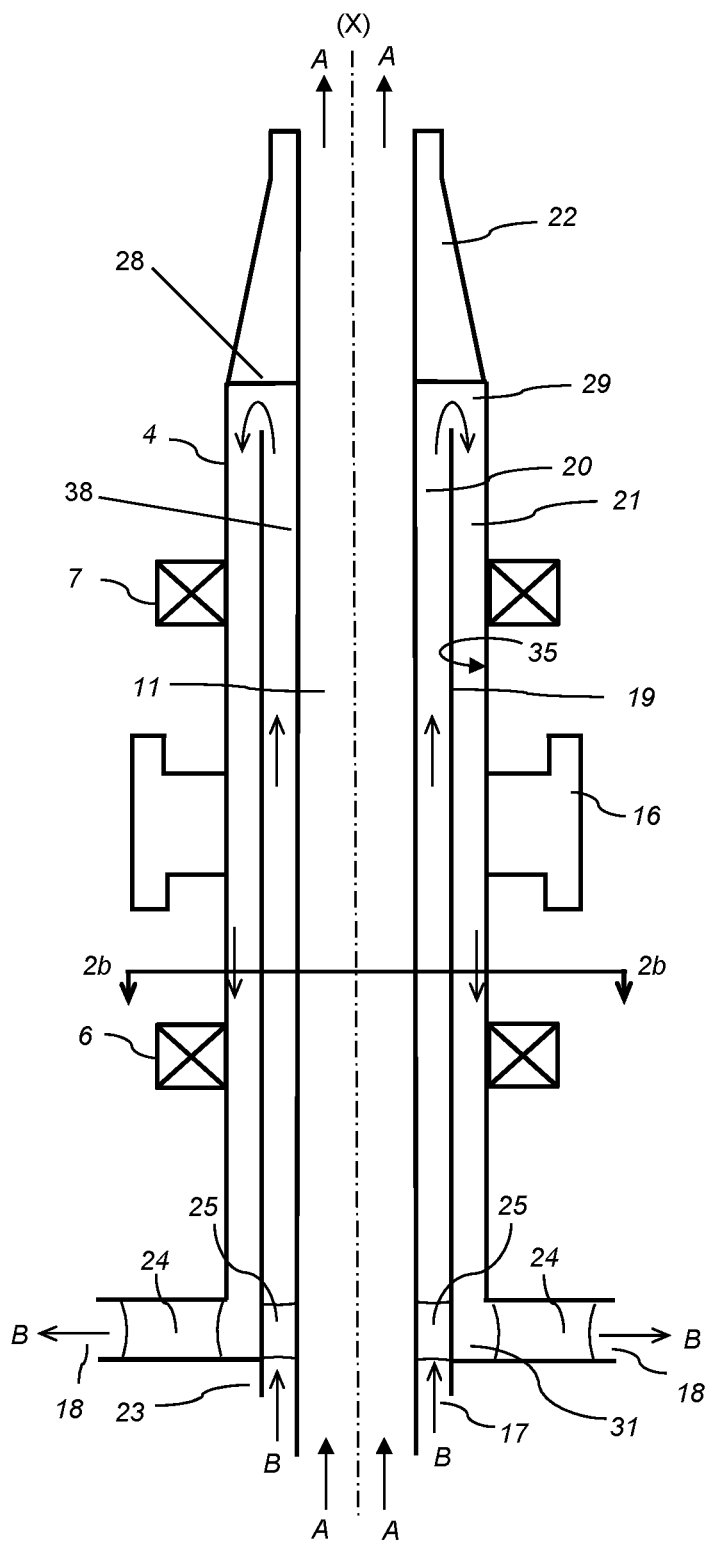
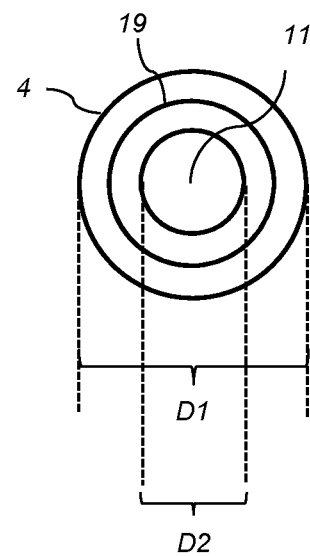
Fig. 2a
Fig. 2b

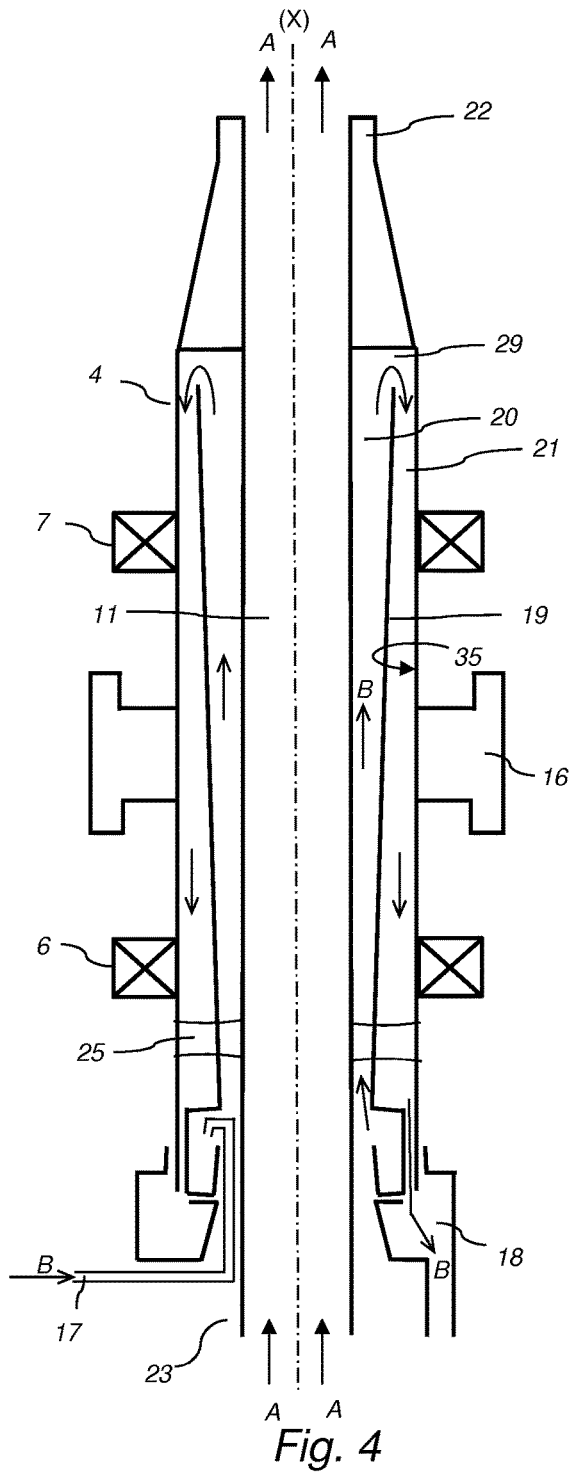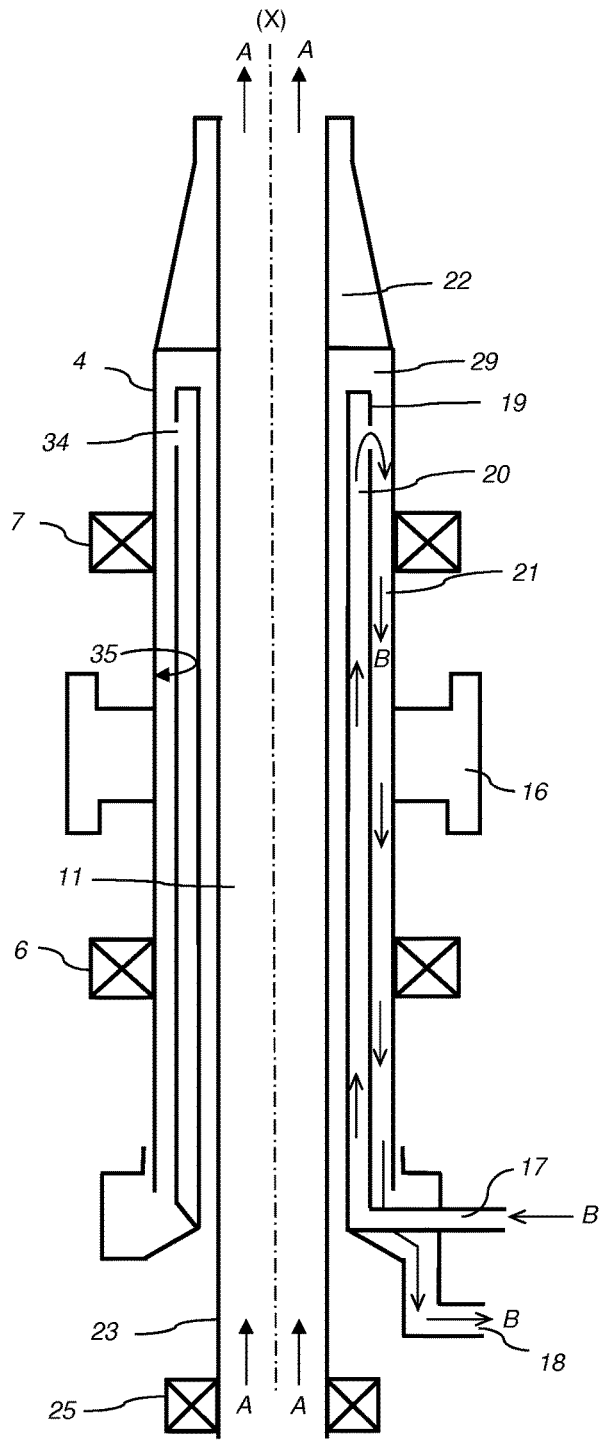
Fig. 4
Fig. 5

COOLING OR HEATING OF BEARINGS IN A CENTRIFUGAL SEPARATOR

FIELD OF THE INVENTION

The present invention relates to the field of centrifugal separators, and more specifically for cooling bearings in a centrifugal separator.

BACKGROUND OF THE INVENTION

Centrifugal separators are generally used for separation of liquids and/or for separation of solids from a liquid. During operation, liquid mixture to be separated is introduced into a rotating bowl and heavy particles or denser liquid, usually water, accumulates at the periphery of the rotating bowl whereas less dense liquid accumulates closer to the central axis of rotation. This allows for collection of the separated fractions, e.g. by means of different outlets arranged at the periphery and close to the rotational axis, respectively.

The rotating bowl is usually supported by a rotating shaft, a spindle, but in certain drive system designs heat transportation and cooling of the shaft and the bearings supporting such a shaft may be problematic. Heat may for example be generated in the bearings but also in the motor stator and rotor if an electrical motor is used for rotating the shaft, and the rotor is fitted e.g. on the shaft.

In certain designs, a hollow shaft is used for supporting the bowl. In such cases, process media, such as the liquid to be separated, may be introduced to the bowl via the shaft. If the process media is cool enough and has enough flow rate, it may be enough for cooling the bearings supporting the shaft. However, there may be problems when the process media is hot, e.g. hot oil, or when there is no or a low flow through the spindle.

Well-known solutions include e.g. using liquid cooled bearing housings and/or air cooled motor housing and bearings.

However, there is a need in the art for simplified solutions for cooling the bearings of a centrifugal separator.

SUMMARY OF THE INVENTION

A main object of the present invention is to provide a centrifugal separator that facilitates cooling of the bearings.

As a first aspect of the invention, there is provided a centrifugal separator comprising
  a frame,
  a drive member configured to rotate a rotating part in relation to the frame around an axis of rotation (x); wherein
  the rotating part comprises a centrifuge rotor enclosing a separation space, the centrifuge rotor being adjoined to a hollow spindle which is supported by the frame by at least one bearing device,
  characterized in that
  the interior of the hollow spindle is in thermal contact with the at least one bearing device and further comprises
  a thermal transfer medium inlet for supplying a thermal transfer medium to the interior and a thermal transfer medium outlet for withdrawing the thermal transfer medium from the interior;
  directing means for directing thermal transfer medium from the thermal transfer medium inlet to the thermal transfer medium outlet in a first direction along the length of the spindle and in a second direction along the length of the spindle, wherein the second direction is opposite the first direction and wherein said first or second direction is along the inner wall of the interior of the spindle, the inner wall being arranged to rotate during operation of the centrifugal separator.

The centrifugal separator is for separation of a fluid mixture, such as a gas mixture or a liquid mixture. The frame of the centrifugal separator is a non-rotating part, and the rotating part is supported by the frame by at least one bearing device.

The drive member for rotating the rotating part of the separator may comprise an electrical motor having a rotor and a stator. The rotor may be fixedly connected to the rotating part. Advantageously, the rotor of the electrical motor may be provided on or fixed to the spindle of the rotating part. Alternatively, the drive member may be provided beside the spindle and rotate the rotating part by a suitable transmission, such as a belt or a gear transmission.

The rotating part of the separator comprises a centrifuge rotor and a spindle. The centrifuge rotor encloses by rotor walls a separation space in which the separation of the fluid mixture takes place. The separation space may comprise a stack of separation discs, such as a stack of frustoconical separation discs. The separator also comprises an inlet for fluid to be separated and at least one outlet for fluid that has been separated.

The centrifuge rotor is adjoined to a hollow spindle, i.e. a rotating shaft, and is thus mounted to rotate with the spindle. The spindle is thus rotatable around the axis of rotation (X). The centrifugal separator may be arranged such that the centrifuge rotor is supported by the spindle at one of its ends, such as the bottom end or the top end of the rotor.

The at least one bearing device is attached or connected to the spindle and may comprise a ball bearing. The bearing device thus supports the spindle. As an example, the bearing device may comprise at least one ball-bearing, such as at least two ball-bearings, attached to the spindle. The at least one bearing device may be an upper and a lower ball bearing. The at least one bearing device may thus be attached or connected to the outer surface of the spindle.

Furthermore, the interior of the hollow spindle is in thermal contact with the at least one bearing device. The interior of the spindle is thus used for cooling the at least one bearing devices. This is achieved by having a thermal transfer medium inlet for supplying a thermal transfer medium to the interior of the spindle and a thermal transfer medium outlet through which thermal transfer medium may leave the interior of the spindle.

The thermal transfer medium may be a gas, such as air, a liquid or a mist. The liquid may be an aqueous liquid, such as water, or e.g. an alcohol, such as ethanol. The thermal transfer medium may be retained within the interior of the spindle as thermal transfer medium flows from the thermal transfer medium inlet to the thermal transfer medium outlet. The thermal transfer medium outlet may be arranged radially outside the thermal transfer medium inlet.

The interior of the spindle further comprises directing means for directing thermal transfer medium from the inlet to the outlet, i.e. facilitating the flow or transport of thermal transfer medium from the inlet to the outlet. The flow of thermal transfer medium is at least via a first direction along the length of the spindle and via second direction along the length of the spindle. The second direction is opposite the first direction and the first or second direction is along the inner wall of the spindle. Since the spindle rotates during operation, also the inner wall of the spindle rotates during operation. The rotating inner wall is in thermal contact with the at least one bearing device.

The spindle, and thereby the rotating inner wall, may be arranged to rotate at a speed of above 3000 rpm, such as above 3600 rpm.

The first aspect of the invention is based on the insight that the rotating inner wall of the spindle may be used for transporting thermal transfer medium to the bearing devices. The spindle itself rotates during use of the separator, and by using this rotation also for transport of thermal transfer medium to the bearings, less external transporting means are necessary. A design that makes use of the rotating inner wall may facilitates that the thermal transfer medium may be pumped through the interior of the spindle without the use of an external pump. The bearing cooling or heating arrangement of the first aspect further provides an excellent thermal profile along the radius of the spindle. Furthermore, the cooling of the bearings according to the first aspect of the invention may further aid in cooling e.g. the motor that may be used for rotating the rotating part of the centrifugal separator.

The thermal transfer medium may be a cooling medium or a heating medium. The cooling medium is for decreasing the temperature of the bearings whereas the heating medium is for increasing the temperature of the bearings.

In embodiments of the first aspect of the invention, the thermal transfer medium is a cooling medium. This means that the centrifugal separator may comprise a cooling medium inlet for supplying a cooling medium to the interior and a cooling medium outlet for withdrawing the cooling medium from the interior;

directing means for directing cooling medium from the cooling medium inlet to the cooling medium outlet in a first direction along the length of the spindle and in a second direction along the length of the spindle, wherein the second direction is opposite the first direction and wherein said first or second direction is along the inner wall of the interior of the spindle, the inner wall being arranged to rotate during operation of the centrifugal separator.

In embodiments of the first aspect, the thermal transfer medium is a heating medium. This thus means that the separator may comprise a heating medium inlet for supplying a heating medium to the interior and a heating medium outlet for withdrawing the heating medium from the interior;

directing means for directing heating medium from the heating medium inlet to the heating medium outlet in a first direction along the length of the spindle and in a second direction along the length of the spindle, wherein the second direction is opposite the first direction and wherein said first or second direction is along the inner wall of the interior of the spindle, the inner wall being arranged to rotate during operation of the centrifugal separator.

In embodiments of the first aspect of the invention, the centrifuge rotor is adjoined to the spindle at a first end of the spindle and the thermal transfer medium inlet and the thermal transfer medium outlet are arranged at a second end, opposite the first end, of the spindle.

The spindle may have a first portion at one end of the spindle and a second portion at the other end of the spindle, and the centrifuge rotor may be arranged at the first portion and the thermal transfer medium inlet and outlet may be arranged on a portion of the spindle other than the first portion, such as at the second portion.

The end portion onto which the rotor is adjoined may be an upper end or portion of the spindle or the lower end or portion of the spindle. Thus, the centrifuge rotor may be axially above or below the spindle, if the rotational axis X is a vertical axis. If the spindle is below the centrifuge rotor, the thermal transfer medium inlet and outlet may both be arranged at the bottom end of the spindle, whereas the centrifuge rotor is adjoined to the top end of the spindle.

As an example, thermal transfer medium may be transported from the thermal transfer medium inlet at the bottom end of the spindle to the top of the spindle in the first direction, and then turn and flow along the rotating inner wall down to the thermal transfer medium outlet.

Further, the bearing means may be arranged on the spindle axially between the first end and the second end of the spindle, i.e. arranged between the thermal transfer medium inlet and outlet and the centrifuge rotor.

In embodiments of the first aspect of the invention, the hollow spindle defines a central inner duct extending along the axis of rotation (x) that is arranged to be through-flown by process medium during operation of the centrifugal separator and further comprises an annular outer space arranged radially outside the central inner duct, wherein the annular outer space is in thermal contact with the at least one bearing device and the directing means are arranged for directing the thermal transfer medium within the annular outer space.

The hollow spindle may thus comprise a central inner duct extending along the axis X of rotation. During operation of the separator, process medium may flow through the central duct. The process medium may be inlet feed, such as a liquid mixture that is to be separated in the separation space. Thus, the central duct may be connected to the inlet of the separator. The process medium may also be liquid that has been separated in the separation space, i.e. the central duct may be connected to an outlet, such as a liquid outlet, of the separator. In embodiments, the separator is arranged such that both inlet feed and a liquid that has been separated is led through the central duct. In that case, the hollow spindle may comprise further axially extending ducts. In other words, the process medium may be inlet feed to be separated in the separator, separated liquid from the separation chamber, or both.

According to the present embodiment, the spindle has further an annular space at a radius from rotational axis X that is larger than the radius of the central duct. The annular space is in thermal contact with the at least one bearing device, meaning that thermal transfer medium flowing in the annular space may cool the bearing devices. The annular space may thus be arranged at the inner wall of the spindle, and the at least one bearing device may be in thermal contact with the outer surface of the spindle, such as attached to or connected to the outer surface of the spindle. The annular outer space may extend axially substantially throughout the entire length of the spindle, such as extending at least throughout 50% of the length of the spindle, such as extending at least throughout 75% of the length of the spindle.

The spindle may have a diameter of at least 5 mm, such as at least 10 mm. For example, the outer diameter of the spindle may be between 5-300 mm, such as between 10-200 mm.

The central inner duct may have a diameter that is more than half of the diameter of the spindle, such as more than 75% of the diameter of the spindle.

In the embodiments in which the spindle comprises a central inner duct for process media, the interior of the spindle being in thermal contact with the bearings is thus the annular outer space surrounding the central inner duct. Thermal transfer medium may thus be introduced and withdrawn from this annular outer space. This means that the thermal transfer medium may be pressurized and may also form a closed cooling loop.

As an example, when the hollow spindle defines a central inner duct, the directing means may comprise at least one jet nozzle for spraying thermal transfer medium in the first direction.

Thus, jet nozzles may be used for spraying or jetting thermal transfer medium in the first direction in the annular outer space, and the thermal transfer medium may then be guided along the rotating inner wall in the second direction.

As a further example, the directing means may comprise a dividing member for dividing the annular outer space into a first flow channel, in which the thermal transfer medium flows in the first direction and a second flow channel, in which the thermal transfer medium flows in the second direction.

The annular outer space may thus further comprise a dividing member that divides the annular outer space into at least two flow channels, such as a first flow channel and a second flow channel In embodiments, the annular outer space contains just a first and a second flow channel. The dividing member in the annular outer space may be a wall extending in the axial direction. The dividing member may be stationary or arranged to rotate with the spindle. The dividing member may thus divide the annular outer space such that the thermal transfer medium is directed in two flow channels. The flow direction of the first flow channel may be along the length of the spindle and the flow direction of the second flow channel may also be along the length of the spindle, but opposite the flow direction of the first flow channel. When flowing from the thermal transfer medium inlet to the thermal transfer medium outlet, the thermal transfer medium flows through the first flow channel before flowing through the second flow channel. The first flow channel may thus be upstream the second flow channel. The first flow channel may be radially closer to the central duct compared to the second flow channel. For example, the first flow channel may run in the annular outer space along the wall to the central duct. The second flow channel may run in the annular outer space along the rotating outer wall of the hollow spindle and be in thermal contact with the at least one bearing device.

Furthermore, the first flow channel may be connected to the thermal transfer medium inlet and the second flow channel is connected to the thermal transfer medium outlet Thus, the second flow channel may be arranged downstream the first flow channel.

Moreover, the second flow channel may be arranged radially outside the first flow channel.

This is advantageous in that allows the use of an internal fan for transporting the thermal transfer medium through the spindle.

The thermal transfer medium may thus be transported from the bottom of the spindle to the top in the first flow channel, and after entering the second flow channel, the thermal transfer medium may contact the inner side of the outer wall of the hollow spindle and flow downward, by means of e.g. a pump or by gravity, and at the same time cool any bearings attached to the outer wall of the spindle before exiting the spindle at the bottom.

As a further example, the dividing member may be arranged such that the thermal transfer medium makes a turn of at least 120° from the first flow channel to the second flow channel.

As an example, the dividing member may be arranged such that the thermal transfer medium makes a turn of approximately 180° from the first flow channel to the second flow channel. In other words, the thermal transfer medium may make a hairpin turn from the first to the second flow channel.

Furthermore, the dividing member may be arranged to co-rotate with the spindle.

Furthermore, the centrifugal separator may further comprise a plurality of vanes arranged to drive the flow of the thermal transfer medium from the thermal transfer medium inlet to the thermal transfer medium outlet The vanes may thus function as a fan pumping the air from the inlet to the outlet. The separator may comprise a radial flow fan arranged to rotate with the spindle, and the vanes may be part of such a radial flow fan. This may e.g. be advantageous in cases where the thermal transfer medium is a gas or a mist.

The plurality of vanes may be arranged to co-rotate with the spindle.

The plurality of vanes may be radial vanes, i.e. the radial flow fan may be arranged such that the vanes extend in a direction that is substantially perpendicular to the axis x of rotation, thereby driving the gas from the thermal transfer medium inlet to the outlet. The vanes themselves may be curved.

The plurality of vanes may be arranged in at the thermal transfer medium outlet. The vanes may thus be arranged in the same space as the thermal transfer medium outlet. When arranged at the thermal transfer medium outlet, the vanes may aid in creating a pressure difference that rive the thermal transfer medium from the inlet to the outlet.

The plurality of vanes and/or the thermal transfer medium outlet, may thus be arranged in the annular space surrounding the central duct at a radial position that is further away from rotational axis x as compared to the first and second flow channels.

In embodiments, the dividing member and the vanes are arranged as a single unit and arranged to co-rotate with the spindle.

As an example, the centrifuge rotor may adjoined to the spindle at a first end and the thermal transfer medium inlet and the thermal transfer medium outlet may be arranged at a second end, opposite the first end, of the spindle and the radial vanes may be arranged in a volume at the same end of the spindle as the thermal transfer medium inlet and the thermal transfer medium outlet.

Furthermore, the dividing member may have a conical shape and be arranged in the annular space such that the first and second flow channels becomes wider in the downstream direction of the thermal transfer medium.

The conical shaped dividing member may thus be arranged to co-rotate with the spindle. This may be advantageous in embodiments where the thermal transfer medium is a liquid, such as an aqueous liquid.

In further examples, the dividing member is a stationary dividing member.

The stationary dividing member may be a fixed pipe that is arranged in the annular outer space and not in contact with the central inner duct.

The first flow channel may then be within the fixed pipe and the thermal transfer liquid may be guided flow from the inlet, through the fixed pipe and then out of the fixed pipe to the second flow channel extending around the fixed pipe and further to the outlet.

In embodiments of the first aspect of the invention the hollow spindle is arranged not to be through-flown by process medium during operation of the centrifugal separator.

Thus, the separator may be arranged such that e.g. inlet feed and separated liquids are not transported via the spindle. The spindle could however comprise pipes etc. for operating liquids for of an intermittent discharge system, i.e. for liquids that are not considered as process media.

For example, when the hollow spindle is arranged not to be through-flown by process medium, the directing means comprises at least one jet nozzle for spraying thermal transfer medium in the first direction.

At least one jet nozzle may thus be arranged in the centre of the hollow interior and arranged to jet thermal transfer medium in the first direction, and the thermal transfer medium may then flow along the rotating inner walls in the second direction.

Furthermore, the directing means may comprise a central inner pipe in which the thermal transfer medium flow in the first direction and an annular outer space which is in thermal contact with the at least one bearing device and arranged radially outside the central inner pipe, and in which annular outer space the thermal transfer medium flows in the second direction.

The central inner pipe may be stationary or arranged to co-rotate with the spindle. The central inner pipe may be arranged along rotational axis X. The annular outer space is radially outside the central inner pipe, i.e. at a radius from rotational axis X that is larger than the radius of the central pipe. The annular outer space may thus be arranged at the inner periphery of the spindle, i.e. at the rotating inner wall.

The annular outer space may extend axially substantially throughout the entire length of the spindle, such as extending at least throughout 50% of the length of the spindle, such as extending at least throughout 75% of the length of the spindle.

When flowing from the inlet to the outlet, the thermal transfer medium flows through the central duct before flowing in the annular outer space. The central duct may thus be upstream the annular outer space.

Furthermore, the thermal transfer medium inlet may be arranged for supplying thermal transfer medium to the central inner pipe and the thermal transfer medium outlet may be arranged for withdrawing the thermal transfer medium from the annular outer space.

The thermal transfer medium inlet may thus be connected to the central inner pipe whereas a thermal transfer medium outlet may be connected to the annular outer space. Thus the annular outer space is downstream the central inner pipe as thermal transfer medium flows from the inlet to the outlet Moreover, the central inner pipe may be arranged such that the thermal transfer medium makes a turn of at least 120° from the central inner pipe to the annular outer space as it flows from the thermal transfer medium inlet to the thermal transfer medium outlet.

As an example, the central inner pipe may be arranged such that the thermal transfer medium makes a turn of about 180° from the central inner pipe to the annular outer space as it flows from the inlet to the outlet. In other words, the thermal transfer medium may make a hairpin turn as flows from the central inner pipe to the annular outer space. During operation, the flow direction of thermal transfer medium in the central inner pipe is along the length of the spindle and the flow direction in the annular may also be along the length of the spindle, but opposite the flow direction in the central inner pipe.

Furthermore, also in embodiments in which the hollow spindle is arranged not to be through-flown by process medium during operation of the centrifugal separator, the separator may further comprise a plurality of vanes arranged to drive the flow of thermal transfer medium from the thermal transfer medium inlet to the thermal transfer medium outlet. The vanes may thus function as a fan pumping the air from the inlet to the outlet. The separator may thus comprise a radial flow fan arranged to rotate with the spindle, and the vanes may be part of such a radial flow fan. The plurality of vanes may be radial vanes, i.e. the radial flow fan may be arranged such that the vanes extend in a direction that is substantially perpendicular to the axis x of rotation, thereby driving the gas from the thermal transfer medium inlet to the outlet. The vanes themselves may be curved.

The plurality of vanes may be arranged to co-rotate with the spindle.

Thus, no external drive mechanism may be needed, but the internal fan driving the cooling gas is driven by the rotation of the spindle.

Further, the plurality of vanes may be arranged at the thermal transfer medium outlet.

Consequently, the vanes may thus be arranged in the same space as the thermal transfer medium outlet.

The plurality of vanes may be arranged such downstream of the annular outer space such but upstream of the actual gas outlet. When arranged at the thermal transfer medium outlet, the vanes may aid in creating a pressure difference that drive e.g. a cooling gas from the inlet to the outlet.

The plurality of vanes may also be arranged in within the central inner pipe, i.e. at the thermal transfer medium inlet.

The plurality of vanes may be arranged in a space that extends further in the radial direction as compared to the spindle.

The plurality of vanes and/or the thermal transfer medium outlet, may thus be arranged in a space surrounding the central duct at a radial position that is further away from rotational axis x as compared to the central inner duct and the annular outer space.

In embodiments, the central inner duct and the plurality of vanes are arranged as a single unit that is arranged to co-rotate with the spindle.

Moreover, the spindle may have a radius of R1, and wherein the vanes extend radially from the radius R1.

Thus, the plurality of vanes may not extend all the way in to the rotational axis but may instead start extending in the radial direction approximately at the outer most radial position of the spindle.

As an example, the number of vanes may be at least three, such as at least ten, such as at least fifteen, such as at least twenty. Furthermore, the vanes may be slightly curved.

Furthermore, the central inner pipe may extend in the spindle axially past the at least one bearing device.

As discussed above, the centrifuge rotor may be adjoined to the spindle at a first end and the thermal transfer medium inlet and the thermal transfer medium outlet are arranged at a second end, opposite the first end, of the spindle. The central inner pipe may thus extend from the second end of the spindle, e.g. extending along more than 50% of the length of the spindle, such as along more than 75% of the length of the spindle, such that thermal transfer medium leaving the central inner pipe leaves at an axial position that is closer to the rotor than the bearing devices, thereby axially passing all bearing devices after turning to the opposite flow direction in the in the annular outer space.

Moreover, the centrifugal separator may comprise a tank for thermal transfer medium and means for delivering thermal transfer medium to the thermal transfer medium inlet. Such means may be pipes and a pump for transporting thermal transfer medium from the tank to the inlet.

As a second aspect of the invention, there is provided a method for cooling or heating at least one bearing device of a centrifugal separator, comprising providing a centrifugal separator according to any one of the aspects above; and supplying thermal transfer medium into the thermal transfer medium inlet and withdrawing thermal transfer medium from the thermal transfer medium outlet.

The method may further comprise rotating the centrifuge rotor at the operational speed of the centrifugal separator.

The method may further comprise supplying liquid mixture to be separated to the centrifuge rotor. This may be performed simultaneously as supplying cooling gas to the cooling gas inlet. The liquid mixture may be supplied at a rate that is more than ten times the rate of the supply of thermal transfer medium, such as more than twenty times the rate of the supply of thermal transfer medium, if the rate is expressed as m/s.

As discussed above, the thermal transfer medium may be a cooling medium or a heating medium. The cooling medium is for lowering the temperature in the bearing means whereas the heating medium is for increasing the temperature in the bearing means.

Depending on the application, the liquid mixture to be separated may have different temperature. As an example, the liquid mixture supplied to the separator may have a temperature of at least 90° C., such as at least 95° C., such as at least 98° C. In such applications, there may be a need to cool the bearings, i.e. the thermal transfer medium may be a cooling medium. In certain applications, the liquid mixture supplied to the separator may have a temperature of below 10° C., such as below 5° C., such as below 0° C. In such applications, there may be a need to heat the bearings, i.e. the thermal transfer medium may be a heating medium.

If the separator is a separator in which hollow spindle defines a central inner duct arranged to be through-flown by process medium during operation, the method may further comprise supplying liquid mixture to be separated in the central duct of the spindle to the centrifuge rotor. This may be performed simultaneously as supplying thermal transfer medium to the thermal transfer medium inlet.

BRIEF DESCRIPTION OF THE DRAWINGS

FIGS. 2a and 2b show a schematic drawing of an embodiment on how the bearings of a separator of FIG. 1 may be cooled by means of air.

FIG. 4 shows a schematic drawing of an embodiment on how the bearings a separator of FIG. 1 may be cooled by means of a liquid.

FIG. 5 shows another schematic drawing of an embodiment on how the bearings a separator of FIG. 1 may be cooled by means of a liquid.

DETAILED DESCRIPTION

The centrifugal separator according to the present disclosure will be further illustrated by the following description of an embodiment with reference to the accompanying drawings.

Figure 1:
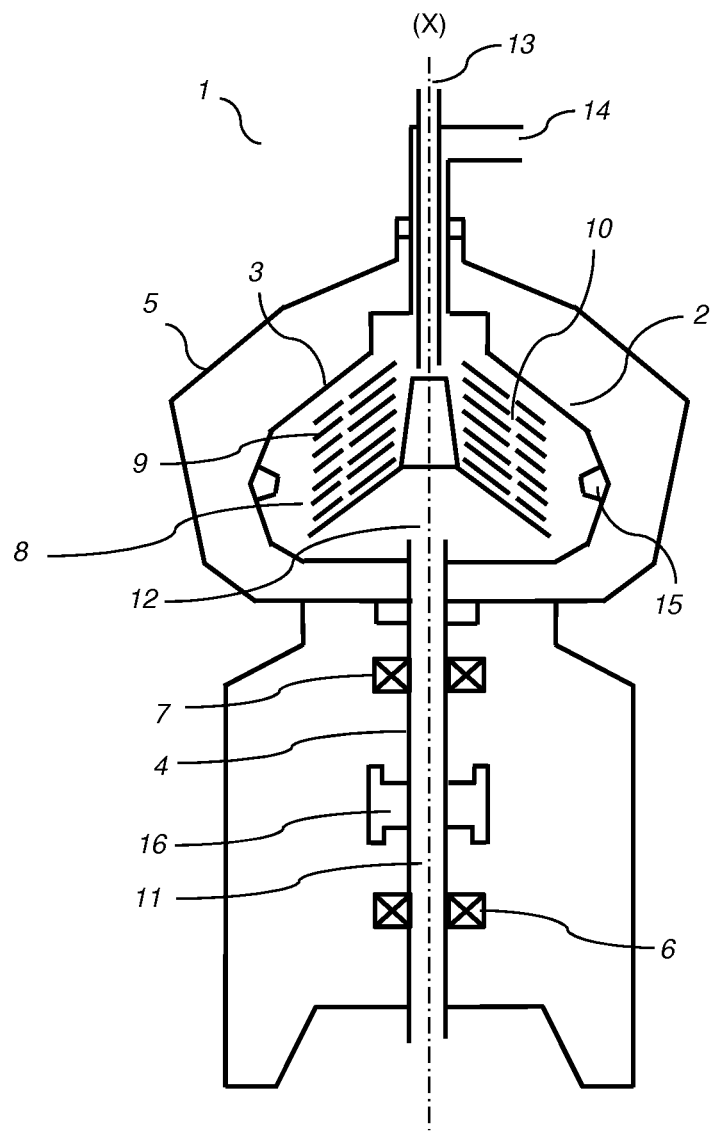
FIG. 1 shows a schematic drawing of a section of a centrifugal separator of the present disclosure, in which inlet feed is led through the spindle.

FIG. 1 shows a schematic example of a centrifugal separator 1, in which inlet feed is led through the spindle 4.

The centrifugal separator 1 comprises a rotating part 2 arranged for rotation about an axis of rotation (X) and comprises rotor 3 and spindle 4. The spindle 4 is supported in the frame 5 of the centrifugal separator in a bottom bearing 6 and a top bearing 7.

The rotor 3 forms within itself a separation chamber 8 in which centrifugal separation of e.g. a liquid mixture to takes place during operation. The centrifugal separator 1 is in this embodiment of a so called hermetic type with a closed separation space 8, i.e. the separation space 8 is intended to be completely filled with liquid during operation. In principle, this means that preferably no air or free liquid surfaces is meant to be present within the rotor 3.

The separation chamber 8 is provided with a stack of frusto-conical separation discs 9 in order to achieve effective separation of the liquid. The stack of truncated conical separation discs 9 are examples of surface-enlarging inserts. These discs 9 are fitted centrally and coaxially with the rotor and comprise holes which form channels 10 for axial flow of liquid when the separation discs 9 are fitted in the centrifugal separator 1.

A central duct 11 extends through the spindle 4, which takes the form of a hollow, tubular member. The central duct 11 forms in this embodiment an inlet channel for introducing the liquid for centrifugal separation to the inlet 12 of the rotor, and thereby provide the material to be separated to the separation space 8. Introducing the liquid material from the bottom provides a gentle acceleration of the liquid material. The spindle 4 is further connected to inlet pipes (not shown) at the bottom of the separator 1, such that liquid material to be separated may be transported to the central duct 11, e.g. by means of a pump.

The rotor 3 has extending from it a liquid light phase outlet 13 for a lower density component separated from the liquid, and a liquid heavy phase outlet 14 for a higher density component, or heavy phase, separated from the liquid. The outlets 13 and 14 extend through the frame 5. The rotor 3 is provided at its outer periphery with a set of radially sludge outlets 15 in the form of intermittently openable outlets for discharge of higher density component such as sludge or other solids in the liquid. This material is thus discharged from a radially outer portion of the separation chamber 8 to the space round the rotor 3.

The centrifugal separator 1 is further provided with a drive motor 16. This motor 16 may for example comprise a stationary element and a rotatable element, which rotatable element surrounds and is so connected to the spindle 4 that during operation it transmits driving torque to the spindle 4 and hence to the rotor 3. The drive motor 16 may be an electric motor. Furthermore, the drive motor 16 may be connected to the spindle 4 by transmission means. The transmission means may be in the form of a worm gear which comprises a pinion and an element connected to the spindle 4 in order to receive driving torque. The transmission means may alternatively take the form of a propeller shaft, drive belts or the like, and the drive motor may alternatively be connected directly to the spindle.

During operation of the separator in FIG. 1, the rotor 3 is caused to rotate by torque transmitted from the drive motor 16 to the spindle 4. Via the central duct 11 of the spindle 4, liquid material to be separated is brought into the separation space 8. In the hermetic type of inlet the acceleration of the liquid material is initiated at a small radius and is gradually increased while the liquid leaves the inlet and enters the separation space 8. However, liquid may also be introduced when the rotor is already running at its operational speed. Liquid material may thus be continuously introduced into the rotor 3.

Depending on the density, different phases in the liquid is separated between the separation discs 9 fitted in the separation space 8. Heavier components in the liquid move radially outwards between the separation discs, whereas the phase of lowest density moves radially inwards between the separation discs and is forced through outlet 13 arranged at the radial innermost level in the separator. The liquid of higher density is instead forced out through outlet 14 that is at a radial distance that is larger than the radial level of outlet 13. Thus, during separation, an interphase between the liquid of lower density and the liquid of higher density is formed in the separation space 8. Solids, or sludge, accumulate at the periphery of the separation chamber 8 and is emptied intermittently from the separation space by the sludge outlets 15 being opened, whereupon sludge and a certain amount of fluid is discharged from the separation space by means of centrifugal force. However, the discharge of sludge may also take place continuously, in which case the sludge outlets 15 take the form of open nozzles and a certain flow of sludge and/or heavy phase is discharged continuously by means of centrifugal force.

In certain applications, the separator 1 only contains a single liquid outlet, such as only liquid outlet 13, and the sludge outlets 15. This depends on the liquid material that is to be processed.

In the embodiment of FIG. 1, the material to be separated is introduced via the central duct 11 of the spindle 4. However, the central duct 11 may also be used for withdrawing e.g. the liquid light phase and/or the liquid heavy phase. In embodiments, the central duct 11 comprises at least one additional duct. In this way, both the liquid mixture to be separated may be introduced to the rotor 3 via the central duct 11, and concurrently the liquid light phase and/or the liquid heavy phase may be withdrawn through the central duct 11.

The cooling of the bottom bearing 6 and the top bearing 7 is further discussed in relation to the embodiments shown in FIGS. 2-5 and 9 below.

FIG. 2a shows a schematic illustration of a cooling arrangement for the bearings of the separator 1. In this embodiment, the cooling medium is air. FIG. 2a shows a cross-section of hollow spindle 4, comprising a central duct 11 for supplying feed to the separator 1. The direction of the feed is illustrated by arrows "A" in the figures. The rotor 3 of the separator 1 is arranged at a first end, in this case the top end 22, of spindle 4. As discussed in relation to FIG. 1, the spindle is supported by top bearing 7 and bottom bearing 6 and is driven by drive motor 16. The spindle 4 has an annular space 29 surrounding the central duct 11. The annular space 29 is above the directing means 19 and formed by a wall 28 extending between an inner wall 38 and an outer wall 35 of the spindle. This space 29 is in thermal contact with the top bearing 7 and the bottom bearing 6. Cooling medium, in this embodiment air, is supplied to this annular space 29 via a cooling medium inlet 17, arranged at the second end 23, which in this case the bottom end of the spindle. Cooling medium is thus supplied at an end that is not attached to the rotor. The path of the cooling medium is illustrated by arrows "B" in the figures. The air is led via a first flow channel 20 along the length of the spindle, and after having passed the bearings 6, 7 the air makes a turn into a second flow channel 21, through which the air is transported in a direction that is opposite the direction in the first flow channel and along the rotating outer wall 35 of the spindle 4. The second flow channel 21 is arranged radially outside the first flow channel 20 and the outer wall of the second flow channel is the rotating outer wall 35 of the spindle 4. The directing means 19, which directs the air from the inlet to the outlet, consists of dividing member 19, in this case an axial wall or cylinder. The dividing member 19 is what divides the annular space 29 into the first and second flow channels. The air leaves the spindle 4 via cooling medium outlet 18 arranged at the same bottom end 23 as the cooling medium inlet 17. The air has thus by travelling through the annular space 29 in the spindle 4 aided in cooling the bottom bearing 6 and top bearing 7. In this embodiment, the transport of air through the spindle is facilitated by the means of an "internal" radial fan comprising vanes 24 that are arranged to co-rotate with the spindle 4. The vanes 24 are arranged at the cooling medium outlet 18 downstream of the second flow channel 22. This part 31 extends further in the radial direction from rotational axis X than the annular space in which the flow channels for the cooling medium is arranged.

Upon rotation of the vanes 24, air is driven from the inlet 17, through the flow channels, and further out via outlet 18. There are also spokes 25 arranged in the first flow channel 20 that aid in stabilising and centering the dividing member 19 as it co-rotates with the spindle. Upon rotation, these spokes may also aid in transporting the air from the inlet 17 to the outlet 18.

FIG. 2a is a schematic drawing and is thus not drawn into scale. FIG. 2b is a cross-section of the spindle 4 of FIG. 2a along line 2b-2b. The total diameter D1 of the spindle may be 5-300 mm, such as 10-200 mm, and the central inner duct may have a diameter D2 such that D2 has a length that is more than half of D1, such as more than 75% of the length of D1. The dividing member 19 may be arranged centrally in the annular outer space 29.

Figures 3A, 3B:
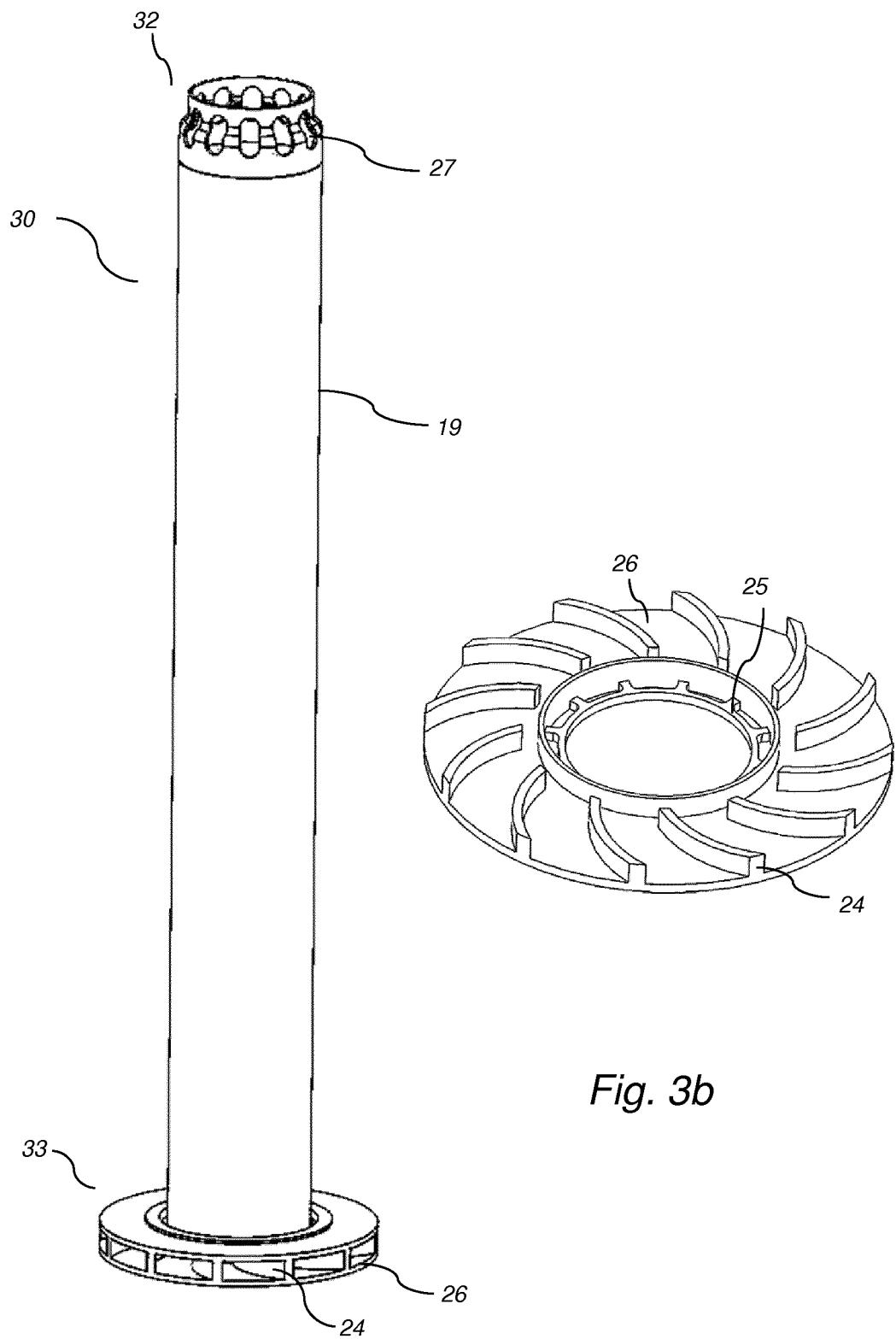
FIGS. 3a and 3b show a dividing member and vanes that may form part of an internal fan of the embodiment shown in FIGS. 2a and 2b.

FIG. 3a shows an example on how the dividing member 19 and vanes 24 may be arranged as a single unit 30 and used in e.g. the embodiment as shown in FIG. 2a. The vanes 24 are arranged on a disc 26 and the dividing member 19 are in the form of a hollow cylinder that is fitted into the annular space 29 of the spindle 4. When fitted into the spindle 4, the first flow channel 20 is thus arranged "inside" this cylinder whereas the second flow channel 21 is arranged "outside" this cylinder. Cooling medium is directed to from the first flow channel to the second flow channel via holes 27 arrange on the dividing member 19 at the end 32 opposite the end 33 at which the disc 26 with vanes 24 is arranged.

FIG. 3b further shows a close-up view of a disc 26 upon which the vanes 24 are arranged. The vanes are slightly bent in the intended direction of rotation. Also shown are spokes 25 that aid in centering the dividing member 19 in the annular space 29 of the spindle 4. The vanes 24 thus work as a radial fan driving cooling medium such as air from the inlet 17 to the outlet 18. In this case, the disc 26 comprises twelve vanes, but other number of vanes is of course also possible. In embodiments, the separator comprises more than 4 vanes, such as more than 10 vanes, such as more than 20 vanes.

FIG. 4 shows another schematic illustration of a cooling arrangement for the bearings of the separator 1. In this embodiment, the cooling medium is a liquid, such as water. FIG. 4 shows a cross-section of hollow spindle 4, comprising a central duct 11 for supplying feed to the separator 1. The direction of the feed is illustrated by arrows "A" in the figures. The rotor 3 of the separator 1 is arranged at a first end, in this case the top end 22, of spindle 4. As discussed in relation to FIG. 1, the spindle is supported by top bearing 7 and bottom bearing 6 and is driven by drive motor 16. The spindle 4 has an annular space 29 surrounding the central duct 11. This space 29 is in thermal contact with the top bearing 7 and the bottom bearing 6. Cooling water is supplied to this annular space 29 via a cooling medium inlet 17, arranged at the second end 23, which in this case the bottom end of the spindle. The cooling medium inlet 17 is in the form of a small pipe extending into the annular space 29 at the end 22 of the spindle 4 that is not attached to the rotor. The path of the cooling water is illustrated by arrows "B" in the FIG. 4.

The water is led via a first flow channel 20 along the length of the spindle, and after having passed the bearings 6, 7 the water makes a turn into a second flow channel 21, through which the cooling water is transported in a direction that is opposite the direction in the first flow channel 20 and along the rotating outer wall 35 of the hollow spindle 4. The second flow channel 21 is arranged radially outside the first flow channel 20 and the outer wall of the second flow channel is the rotating outer wall 35 of the spindle 4. In this embodiment, the directing means 19 is dividing member in the form of a conical, hollow cylinder, having its narrowest part at the end 23 at which the cooling water inlet 17 and cooling water outlet 18 are arranged. The cylinder 19 divides the annular space 29 into the first and second flow channels. The cooling water leaves the spindle 4 via cooling medium outlet 18 arranged at the same bottom end 23 as the cooling medium inlet 17. In this embodiment, the transport of cooling water through the spindle 4 is facilitated by the means of the conical structure of the dividing member 19, that upon co-rotation with the spindle facilitates transport of the cooling water from the first flow channel 20 to the second flow channel 22, that is located radially outside the first flow channel 20. There are also spokes 25 arranged in the first flow channel 20 that aid in stabilising and centering the dividing member 19 as it co-rotates with the spindle. Upon rotation, these spokes may also aid in transporting the liquid from the inlet 17 to the outlet 18.

FIG. 5 shows a further schematic illustration of a cooling arrangement for the bearings of the separator 1. In this embodiment, the cooling medium is a liquid, such as water, and the directing means 19 is a dividing member in the form of a stationary "double-walled" pipe. FIG. 5 shows a cross-section of hollow spindle 4, comprising a central duct 11 for supplying feed to the separator 1. The direction of the feed is illustrated by arrows "A" in the figures. The rotor 3 of the separator 1 is arranged at a first end, in this case the top end 22, of spindle 4. As discussed in relation to FIG. 1, the spindle is supported by top bearing 7 and bottom bearing 6 and is driven by drive motor 16. The spindle 4 has an annular space 29 surrounding the central duct 11. This space 29 is in thermal contact with the top bearing 7 and the bottom bearing 6. Cooling water is supplied to this annular space 29 via a cooling medium inlet 17, arranged at the second end 23, which in this case the bottom end of the spindle. The cooling medium inlet 17 is arranged to supply cooling water to the interior of the stationary "double-walled" pipe 19, which functions as the dividing member. The path of the cooling water is illustrated by arrows "B" in the FIG. 5.

The cooling water is led inside the stationary dividing member 19 in a first flow channel 20 along the length of the spindle, and after having passed the bearings 6, 7 the water makes leaves the interior of the dividing member 19 via holes 34 to the annular space. The space radially outside the stationary dividing member 19 in the annular space 29 thus functions as the second flow channel 21, through which the cooling water is transported in a direction that is opposite the direction in the first flow channel 20 and along the rotating outer wall 35 of the hollow spindle 4. In this embodiment, the cooling water may thus not contact the wall to the central inner duct 11, in which the feed flows. This may be advantageous in that the feed is less likely to warm the cooling water. The outer wall of the second flow channel is the outer wall of the spindle 4. The cooling water leaves the spindle 4 via cooling medium outlet 18 arranged at the same bottom end 23 as the cooling medium inlet 17. In this embodiment comprising a stationary cooling pipe, i.e. The stationary dividing member 19, there is also a support bearing 25 arranged axially below the bottom bearing 6 and also axially below the cooling water inlet 17 and the cooling water outlet 18.

Figure 6:
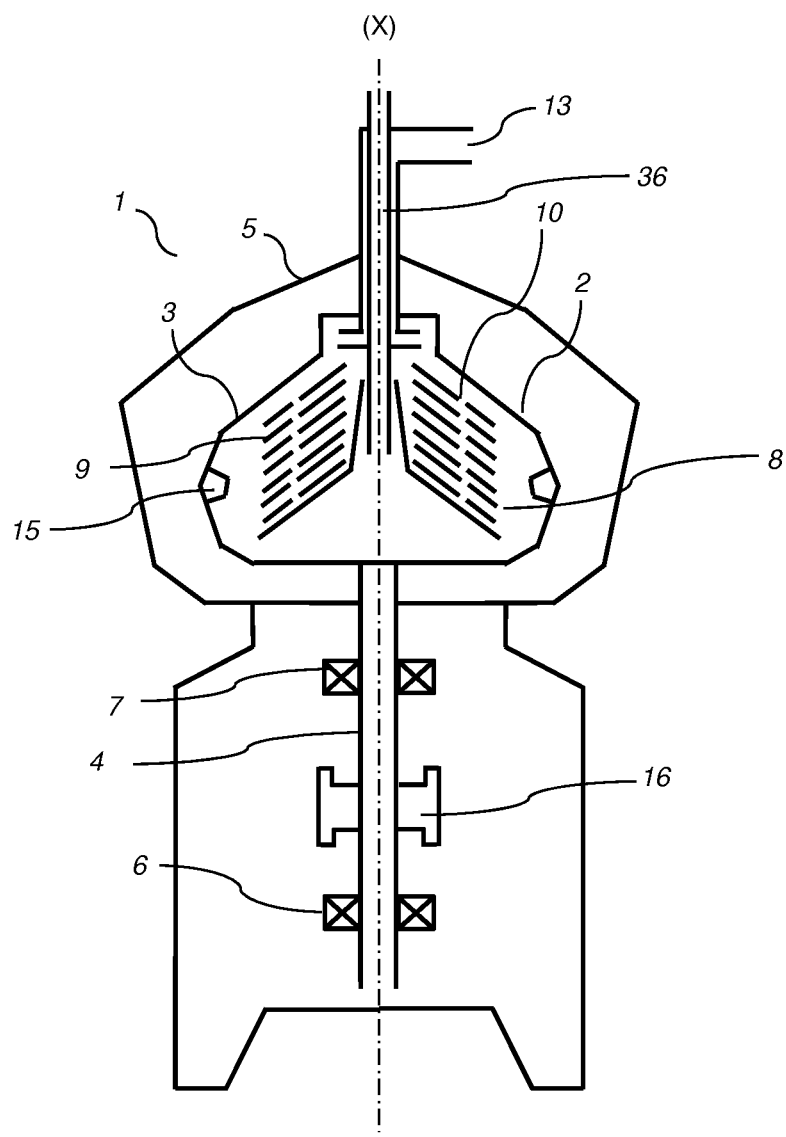
FIG. 6 shows a schematic drawing of a section of a centrifugal separator of the present disclosure, in which inlet feed is not led through the spindle.

FIG. 6 shows a schematic drawing of a section of a centrifugal separator of the present disclosure, in which inlet feed is not led through the spindle.

The parts of this centrifugal separator 1 function as discussed in relation to the separator of FIG. 1. The difference between the separator of FIG. 6 and FIG. 1 is that in the separator of FIG. 6, liquid mixture to be separated is fed from the top via inlet pipe 36 extending down into the rotor 3. In this example, the separator has only one liquid outlet 13, but the separator could also comprise further liquid outlets for liquid phases of other densities than the density of the liquid withdrawn via outlet 13. This depends on the liquid material that is to be processed. In such cases, any liquid of higher density may instead be forced out through a further liquid outlet (not shown) that is at a radial distance that is larger than the radial level of outlet 13. Similar to the separator of FIG. 1, solids, or sludge, accumulate at the periphery of the separation chamber 8 and is emptied intermittently from the separation space by the sludge outlets 15 being opened, whereupon sludge and a certain amount of fluid is discharged from the separation space by means of centrifugal force. However, the discharge of sludge may also take place continuously, in which case the sludge outlets 15 take the form of open nozzles and a certain flow of sludge and/or heavy phase is discharged continuously by means of centrifugal force. No process medium, i.e. liquid mixture to be separated or separated liquid mixture, is led via spindle 4 in the separator of FIG. 6.

The cooling of the bottom bearing 6 and the top bearing 7 of the centrifugal separator 1 of FIG. 6 is further discussed in relation to the embodiments shown in FIGS. 7 and 8 below.

Figure 7:
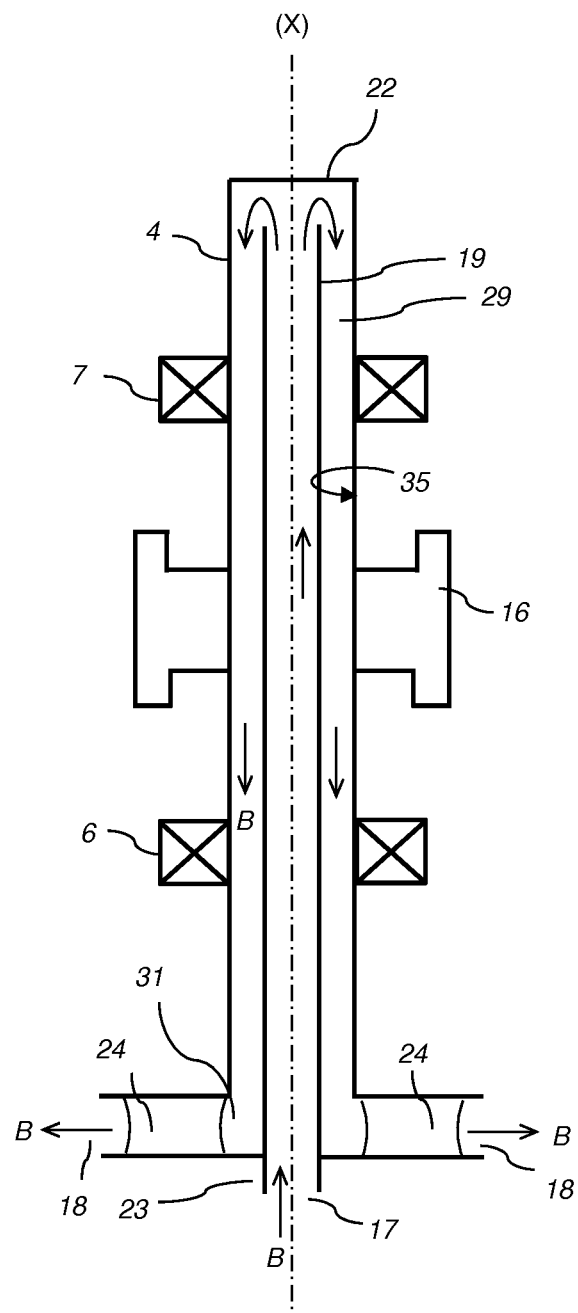
FIG. 7 shows a schematic drawing of an embodiment on how the bearings a separator of FIG. 6 may be cooled by means of air.

FIG. 7 shows a schematic illustration of an embodiment of how the bearings 6, 7 of the separator of FIG. 6 may be cooled by means of air. FIG. 7 shows a cross-section of hollow spindle 4, comprising directing means 19 in the form of a central inner pipe for supply of cooling gas into the spindle 4. The rotor 3 of the separator 1 is arranged at a first end, in this case the top end 22, of spindle 4, which is supported by top bearing 7 and bottom bearing 6 and is driven by drive motor 16. The spindle 4 has further within itself an annular space 29 surrounding the central inner pipe. This space 29 is in thermal contact with the top bearing 7 and the bottom bearing 6. Cooling gas, in this embodiment air, is supplied to the central inner pipe 19 via a cooling gas inlet 17, arranged at the second end 23, which in this case the bottom end of the spindle 4. Cooling air is thus supplied at an end of the spindle 4 that is not attached to the rotor 3. Central inner pipe 19 is arranged to co-rotate with the spindle 4. The path of the cooling gas is illustrated by arrows "B" in FIG. 7. The air is led from the inlet 17 through the central inner pipe along the length of the spindle 4. The central inner pipe thus forms a first flow channel. The central inner pipe terminates axially above the top bearing 7, i.e. the central inner pipe is arranged from the bottom end 23 axially past both the bottom bearing 6 and the top bearing 7. After having passed the bearings 6, 7 the air makes a turn into the annular outer space 29, through which the air is transported in a direction that is opposite the direction in the central inner pipe and along the rotating outer wall 35 of the hollow spindle 4. The cooling air thus makes an approximate 180 degree turn from central inner pipe to the annular space 29. The annular space 29 is arranged radially outside the central inner pipe and the outer wall of the annular space 29 is the rotating inner wall of the spindle 4. The cooling air leaves the spindle 4 via cooling gas outlet 18 arranged at the same bottom end 23 as the cooling medium inlet 17. The air has thus by travelling through the central inner pipe and the annular outer space 29 aided in cooling the bottom bearing 6 and top bearing 7. The transport of cooling air through the spindle from the inlet 17 to the outlet 18 is facilitated by the means of an "internal" radial fan comprising vanes 24 that are arranged to co-rotate with the spindle 4 together with central inner pipe 19. The vanes 24 are arranged at the cooling medium outlet 18 in a part 31 that extends further in the radial direction from rotational axis X than the annular space 29. Upon rotation of the vanes 24, air is driven from the inlet 17, through the central inner pipe, making a turn to the annular space 29 and further out via outlet 18. The vanes 24 in FIG. 7 could be arranged on a disc, similar to the disc 26 as shown in FIGS. 3a and 3b.

Figure 8:
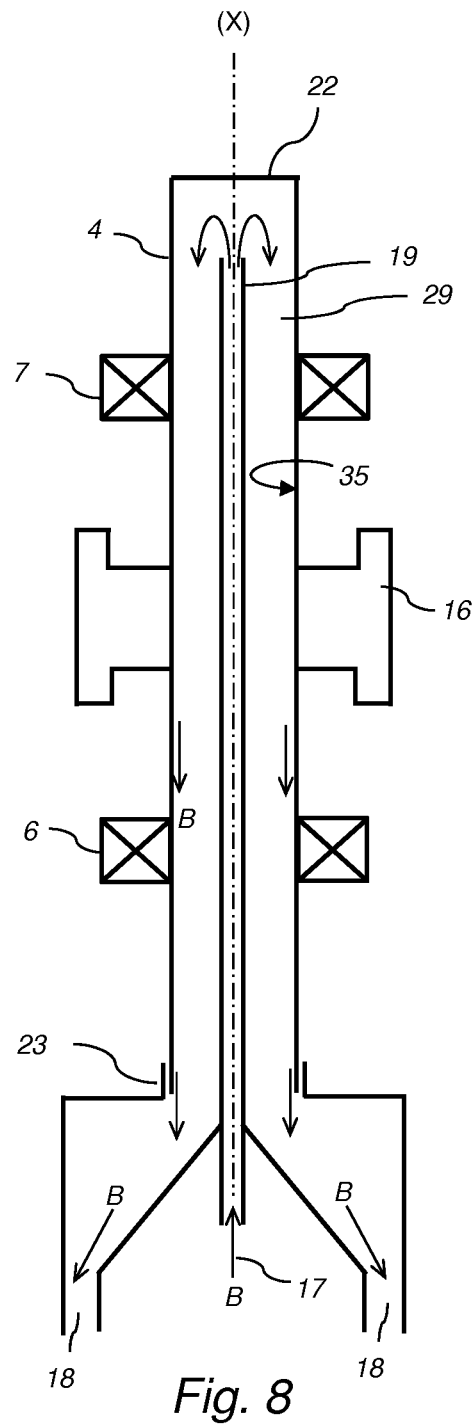
FIG. 8 shows a schematic drawing of an embodiment on how the bearings a separator of FIG. 6 may be cooled by means of a liquid.

FIG. 8 shows a schematic illustration of an embodiment of how the bearings 6, 7 of the separator of FIG. 6 may be cooled by means of a liquid. As in FIG. 7, the directing means 19 is in the form of a central inner pipe extending from the bottom end 23 of the spindle. However, in this case the central inner pipe 19 is a stationary pipe, i.e. arranged so as not to co-rotate with the spindle. Cooling liquid travels the same path, shown by arrows "B", as the path of the cooling gas in FIG. 7, i.e. from the inlet 18, via central inner pipe past the bearings 6, 7, then making a turn in annular space 29 to flow downwards, i.e. in a direction opposite the direction in the central inner pipe, along the rotating outer wall 35 down to a liquid outlet 18. In this case, the flow of liquid may be facilitated by means of an external pump (not shown), and the directing means, i.e. the central inner pipe, directs the cooling liquid in the desired path past the bearings such that the cooling liquid may flow along the rotating outer wall 35 down to the cooling liquid outlet 18.

Figures 9, 10:
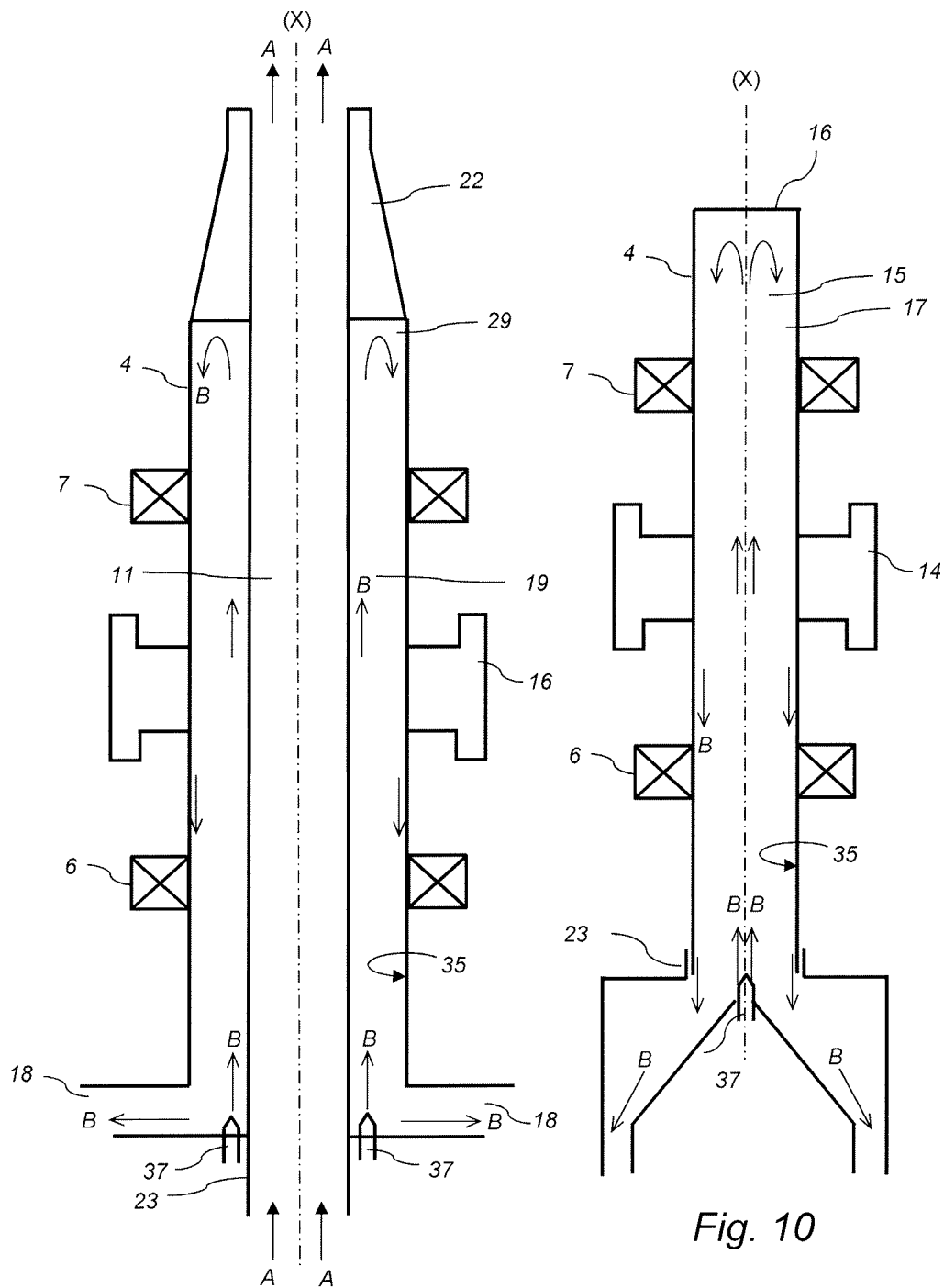
FIG. 9 shows a schematic drawing of an embodiment on how the bearings a separator of FIG. 1 may be cooled and where jet nozzles are used as a directing means for the cooling medium.
FIG. 10 shows a schematic drawing of an embodiment on how the bearings a separator of FIG. 6 may be cooled and where a jet nozzle is used as a directing means for the cooling medium.

FIGS. 9 and 10 further shows two embodiments in which the directing means are in the form of one or several jet nozzles.

FIG. 9 shows a schematic illustration of an embodiment of how the bearings 6, 7 of the separator of FIG. 1 may be cooled by means of jet nozzles 37. The spindle of FIG. 9 is thus similar to the spindle of FIG. 2a, having an axis of rotation extending in a first direction, but the divider is in the form of two jet nozzles 37 arranged in the bottom end 23 of spindle 4. The jet nozzles 37 thus form the cooling medium inlet. During operation, cooling medium is jetted upwards in the first direction in the annular space 29 close to the wall to the central inner duct 11 by the jet nozzles 37 extending in the first direction. The cooling medium is jetted with such force that it passes both bearings 6,7 before losing speed and returning downwards in the second direction, which is along the rotating inner wall 35, to the lower end 23 of the spindle 4, before exiting via a cooling medium outlet 18.

FIG. 10 shows a schematic illustration of an embodiment of how the bearings 6, 7 of the separator of FIG. 6 may be cooled by means of a jet nozzle 37. The jet nozzle 37 is arranged in the interior of hollow spindle 4 at the rotational axis X and at the bottom end 23 of the spindle 4. As in the embodiment of FIG. 9, the jet nozzle 37 forms the cooling medium inlet and cooling medium is jetted upwards along rotational axis X during operation. The cooling medium is jetted with such force that it passes both bearings 6,7 before losing speed and returning downwards in the second direction, which is along the rotating outer wall 35, to the lower end 23 of the spindle 4, before exiting via a cooling medium outlet 18.

Figure 11A:
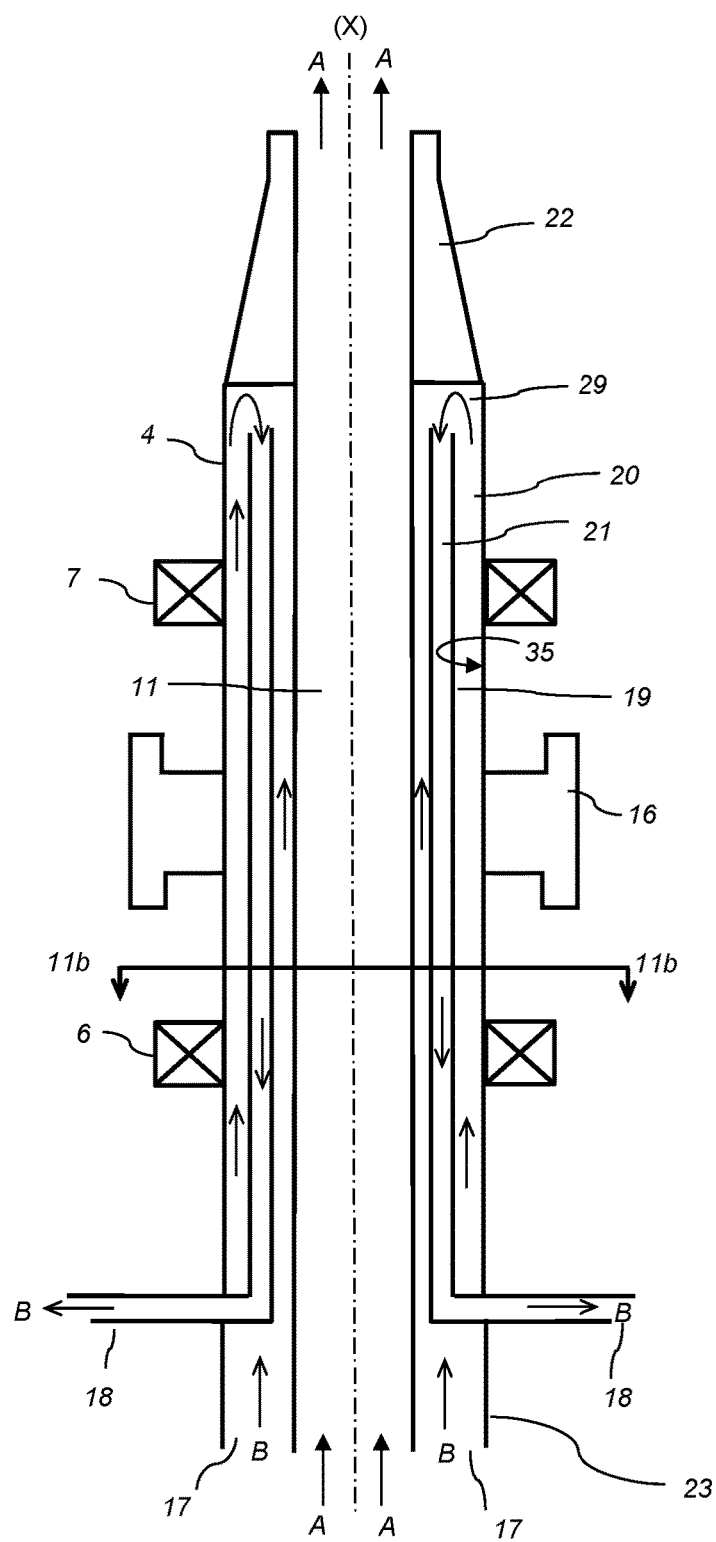
FIGS. 11a and 11b show a schematic drawing of an embodiment on how the bearings of a separator of FIG. 1 may be cooled and in which the cooling medium is guided along the rotating inner wall in its first direction.

FIG. 11a shows a further schematic illustration of a cooling arrangement for the bearings of the separator 1. FIG. 11a shows a cross-section of hollow spindle 4, comprising a central duct 11 for supplying feed to the separator 1. The direction of the feed is illustrated by arrows "A" in the figures. The rotor 3 of the separator 1 is arranged at a first end, in this case the top end 22, of spindle 4. As discussed in relation to the previous embodiments, the spindle is supported by top bearing 7 and bottom bearing 6 and is driven by drive motor 16. The spindle 4 has an annular space 29 surrounding the central duct 11. This space 29 is in thermal contact with the top bearing 7 and the bottom bearing 6. Cooling medium is supplied to this annular space 29 via a cooling medium inlet 17, arranged at the second end 23, which in this case the bottom end of the spindle. Cooling medium is thus supplied at an end that is not attached to the rotor. The path of the cooling medium is illustrated by arrows "B" in the figures. The cooling medium is led via a first flow channel 20 along the length of the spindle, and after having passed the bearings 6, 7 the cooling medium makes a turn into a number of second flow channels 21, through which the cooling medium is transported in a direction that is opposite the direction in the first flow channel. In this embodiment, the cooling medium is transported along the rotating outer wall 35 of the spindle 4 in the first direction, i.e. when guided in a direction from the bottom end 23 to the top end 22 of the spindle. The second flow channels 21 are arranged within the first flow channel 20. The directing means 19, which directs the cooling medium from the inlet to the outlet, comprises the axial walls that define the second flow channels 21. The directing means 19 is thus a dividing member that divides the annular space 29 into the first and second flow channels. As in previous embodiments, cooling medium leaves the spindle 4 via cooling medium outlets 18 arranged at the same bottom end 23 as the cooling medium inlet 17. The cooling medium outlets take the form of radially extending pipes that act as an extension of the second flow channels 21.

Figure 11B:
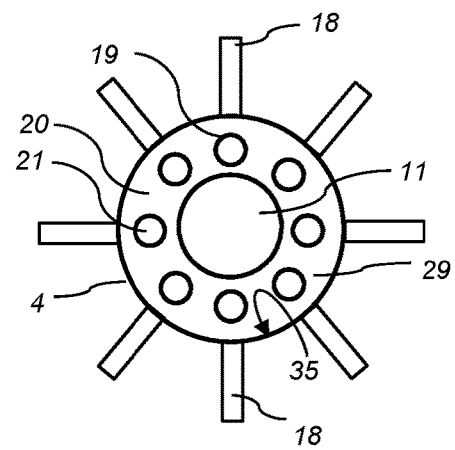

FIG. 11b is a cross-section of the spindle 4 of FIG. 11a along line 11b-11b that further illustrates how the annular outer space 29 are divided into a first flow channel 20 and second flow channels 21. As seen in FIG. 11b, the position of the second flow channels 21 is within the first flow channel 20, i.e. the second flow channels are radially between the wall to the central inner duct 11 and the rotating outer wall 35. As further illustrated in FIG. 11b, outlets 18 are formed as radial extensions of the second flow channels 21 at the bottom end 23 of the spindle 4. As discussed above, the cooling medium is first led along the rotating outer wall 35 in the first flow channel 20 before being guided into the second flow channels 21 and thereafter leaving the annular outer space via outlets 18.

Figure 12:
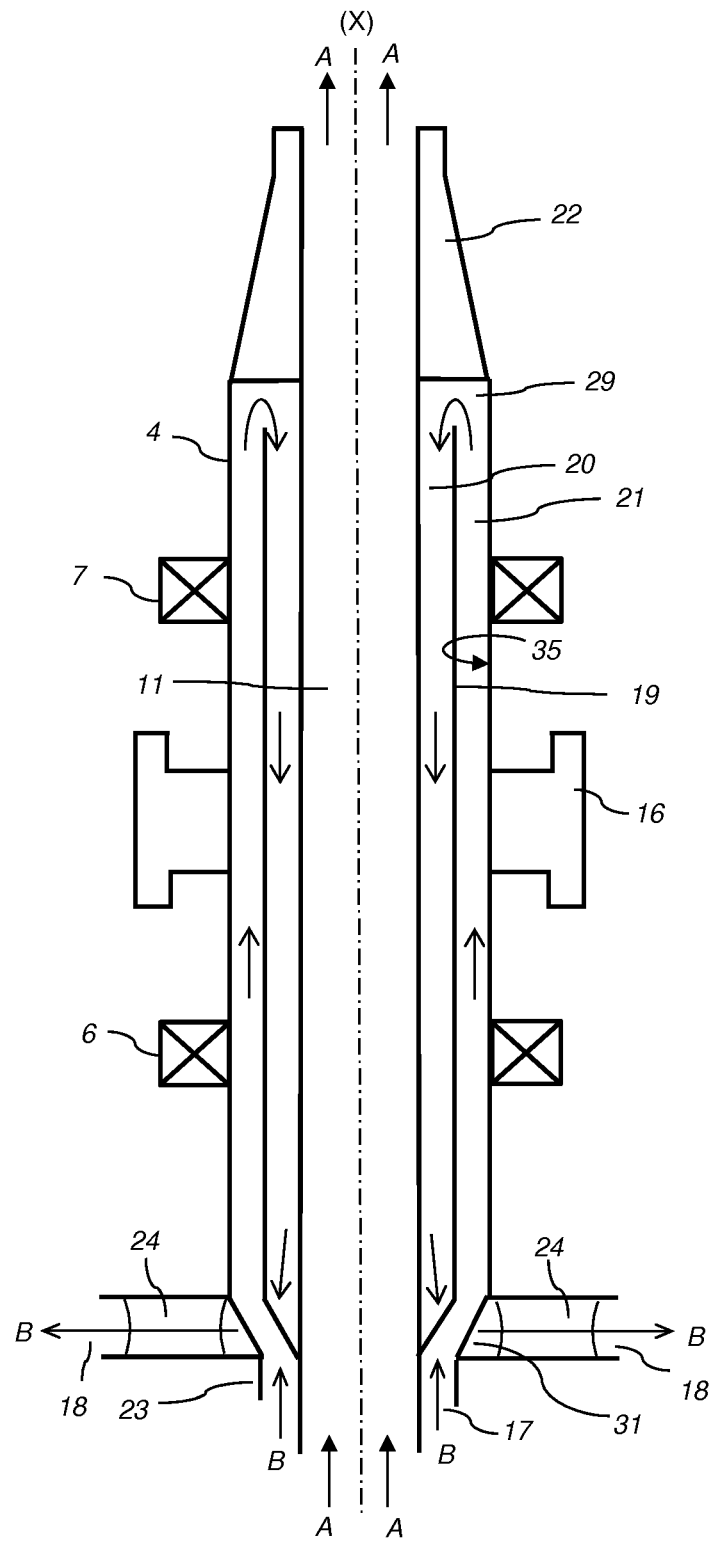
FIG. 12 shows a schematic drawing of an embodiment on how the bearings of a separator of FIG. 1 may be cooled.

FIG. 12 shows a schematic illustration of a cooling arrangement for the bearings of the separator 1 of FIG. 1. This embodiment is similar to the embodiment shown in FIG. 2a, i.e. the same reference numerals apply to the same features. In the arrangement of FIG. 12, the cooling medium may be air or a liquid. The difference between this embodiment and the embodiment shown in FIG. 2a is that the cooling fluid, after being introduced at the bottom end 23 of the spindle 4, is first directed by directing means 19 along the outer surface 35 of the spindle, i.e. in flow channel 21, on its way up to the top end 22 of the spindle. The fluid is then guided along the surface to the wall to the central inner duct 11, i.e. in flow channel 20, back to the bottom end 23 before it is being directed out of the spindle via outlet 18. Thus, the flow channel 21 and flow channel 20 cross each other at the bottom end 23 of the spindle 4.

The invention is not limited to the embodiments disclosed but may be varied and modified within the scope of the claims set out below. As an example, the cooling medium may be a liquid, gas or mist and the cooling medium in the above embodiments may be replaced with a heating medium if the aim is to heat the bearings instead of cooling the bearings. The invention is further not limited to the orientation of the axis of rotation (X) disclosed in the figures. The term "centrifugal separator" also comprises centrifugal separators with a substantially horizontally oriented axis of rotation.

The invention claimed is:

1. A centrifugal separator comprising:
   a frame;
   a centrifuge rotor enclosing a separation space, said centrifuge rotor being adjoined to a hollow spindle supported by the frame by at least one bearing device, an interior of the hollow spindle in thermal contact with said at least one bearing device;
   a stack of separation discs within the separation space; and
   the spindle configured to rotate the centrifuge rotor in relation to the frame around an axis of rotation, wherein the interior of the hollow spindle comprises:
   an inner wall and an outer wall spaced radially from the inner wall;
   a thermal transfer medium inlet for supplying a thermal transfer medium to said interior and a thermal transfer medium outlet for withdrawing said thermal transfer medium from said interior;
   a divider between the inner wall and outer wall of the spindle to create a first flow channel and a second flow channel, the divider directing thermal transfer medium from said thermal transfer medium inlet to said thermal transfer medium outlet in a first direction along a length of the spindle and in a second direction along the length of the spindle, wherein said second direction is opposite said first direction; and
   a wall extending between the inner wall and an outer wall of the spindle, the wall extending between the inner wall and an outer wall of the spindle being spaced above the divider to create a transition zone between the first flow channel and the second flow channel,
   wherein said first or second direction is along an inner wall of said interior of the spindle, said inner wall being arranged to rotate during operation of the centrifugal separator.

2. The centrifugal separator according to claim 1, wherein the centrifuge rotor is adjoined to said spindle at a first end of the spindle and said thermal transfer medium inlet and said thermal transfer medium outlet are arranged at a second end, opposite said first end, of the spindle.

3. The centrifugal separator according to claim 1, wherein the hollow spindle defines a central inner duct extending along the axis of rotation in fluid communication with the separation space and an annular outer space arranged radially outside said central inner duct,
   wherein said annular outer space is in thermal contact with said at least one bearing device and the divider is arranged for directing the thermal transfer medium within the annular outer space.

4. The centrifugal separator according to claim 3, wherein the divider comprises a dividing member for dividing said annular outer space into the first flow channel, in which the thermal transfer medium flows in said first direction and the second flow channel, in which the thermal transfer medium flows in said second direction.

5. The centrifugal separator according to claim 4, in which said second flow channel is arranged radially outside said first flow channel.

6. The centrifugal separator according to claim 4, wherein said dividing member is arranged to co-rotate with the spindle.

7. The centrifugal separator according to claim 4, wherein said dividing member has a conical shape and is arranged in the annular space such that said first and second flow channels becomes wider in the downstream direction of the thermal transfer medium.

8. The centrifugal separator according to claim 4, wherein said dividing member is a stationary dividing member.

9. The centrifugal separator according to claim 8, wherein said stationary dividing member is a fixed pipe that is arranged in said annular outer space and not in contact with said central inner duct.

10. The centrifugal separator according to claim 1, further comprising a plurality of vanes extending outwardly from the divider, the plurality of vanes arranged to drive the flow of said thermal transfer medium from the thermal transfer medium inlet to the thermal transfer medium outlet.

11. The centrifugal separator according to claim 1, wherein the divider comprises a central inner pipe in which the thermal transfer medium flows in said first direction and an annular outer space in thermal contact with said at least one bearing device and arranged radially outside said central inner pipe, and wherein said thermal transfer medium flows in said second direction in the annular outer space.

12. The centrifugal separator according to claim 11, wherein the central inner pipe is arranged such that the thermal transfer medium makes a turn of at least 120° from said central inner pipe to said annular outer space as the thermal transfer medium flows from the thermal transfer medium inlet to the thermal transfer medium outlet.

13. A method for cooling or heating at least one bearing device of a centrifugal separator, comprising:

providing the centrifugal separator according to claim 1; and supplying thermal transfer medium into the thermal transfer medium inlet and withdrawing thermal transfer medium from the thermal transfer medium outlet.

14. The centrifugal separator according to claim 1, further comprising an outlet in the frame, the outlet being above the rotor.

15. The centrifugal separator according to claim 1, wherein the separation discs are frustoconical.

* * * * *